United States Patent
Finan et al.

(10) Patent No.: US 9,552,323 B1
(45) Date of Patent: Jan. 24, 2017

(54) HIGH-SPEED PERIPHERAL COMPONENT INTERCONNECT (PCIE) INPUT-OUTPUT DEVICES WITH RECEIVE BUFFER MANAGEMENT CIRCUITRY

(71) Applicant: Altera Corporation, San Jose, CA (US)

(72) Inventors: Christopher D. Finan, Cupertino, CA (US); Philippe Molson, San Jose, CA (US); Kenny Au, Santa Clara, CA (US); Cora Mau, Sunnyvale, CA (US)

(73) Assignee: Altera Corporation, San Jose, CA (US)

( * ) Notice: Subject to any disclaimer, the term of this patent is extended or adjusted under 35 U.S.C. 154(b) by 619 days.

(21) Appl. No.: 13/936,063

(22) Filed: Jul. 5, 2013

(51) Int. Cl.
  *G06F 13/00* (2006.01)
  *G06F 13/42* (2006.01)

(52) U.S. Cl.
  CPC ................ *G06F 13/4282* (2013.01)

(58) Field of Classification Search
  CPC .................................. G06F 13/4282
  USPC .................... 710/52–53, 310, 308
  See application file for complete search history.

(56) References Cited

U.S. PATENT DOCUMENTS

| | | | | |
|---|---|---|---|---|
| 7,536,473 B2 * | 5/2009 | Ajanovic | ............. | G06F 13/124 370/229 |
| 8,549,183 B2 | 10/2013 | Ajanovic et al. | | |
| 8,782,317 B1 * | 7/2014 | Du | ......... | G06F 13/385 710/308 |
| 8,958,302 B2 * | 2/2015 | Kedem | ................ | H04W 28/02 370/235 |
| 2004/0019714 A1 * | 1/2004 | Kelley | ................. | G06F 13/385 710/52 |

FOREIGN PATENT DOCUMENTS

| | | |
|---|---|---|
| WO | 2006063297 | 6/2006 |
| WO | 2009002835 | 12/2008 |
| WO | 2009006368 | 1/2009 |

* cited by examiner

*Primary Examiner* — Tammara Peyton

(57) ABSTRACT

Interface circuitry is provided to control the flow of data transmitted over a high-speed serial link. The interface circuitry may receive data over a high-speed serial link and store the received data in a receive buffer. The receive buffer may be connected to an additional buffer in an application layer module. The application layer module may produce credits based on the processing capacity of the additional buffer and send those credits to the interface circuitry. The interface circuitry may then send these credits over the high speed link.

21 Claims, 8 Drawing Sheets

HIGH-SPEED PERIPHERAL COMPONENT INTERCONNECT (PCIE) INPUT-OUTPUT DEVICES WITH RECEIVE BUFFER MANAGEMENT CIRCUITRY

BACKGROUND

This invention relates to input-output interconnects and, more particularly, to integrated circuits with high-speed input-output interconnects.

Integrated circuits communicate with one another via communications pathways such as as input-output (I/O) buses. The Peripheral Component Interconnect Express® (commonly referred to as PCI Express or PCIe) technology is a widely adopted bus standard that provides high-speed serial point-to-point data transfer capabilities between integrated circuits. The PCIe interface is typically implemented using a layered architecture having a predefined protocol stack. The PCIe protocol stack includes a transaction layer, a data link layer, and a physical layer. Data that is being output via the PCIe interface and data that is being received via the PCIe interface are processed using the entire protocol stack.

A flow control module inside the transaction layer regulates the data transmission over a high-speed serial link based on available credits. The number of available credits is dependent on the number of available slots in a receive buffer in the transaction layer. Therefore, the number of available credits depends mostly on the size of the receive buffer and the speed at which data is read from the receive buffer.

Situations frequently arise where data transmission is stalled because fast-paced write operations, sometimes referred to as "posted write storms," cause the receive buffer to fill up with data faster than the rate at which data can be processed by the application layer.

SUMMARY

Interface circuitry may be coupled between a high-speed serial link and an application layer module. The application layer module may generate credits and send the credits to the interface circuitry. In response to receiving the credits from the application layer module, the interface circuitry may transmit the received credits over the high-speed serial link.

In certain embodiments, the application layer module may include a buffer coupled to the interface circuitry. The buffer may receive data from the interface circuitry which the interface circuitry received over the high-speed serial link. The initial number of credits generated and sent to the interface circuitry may be based on the size of the buffer. If desired, the application layer module may generate a credit whenever data is read from the buffer.

It is appreciated that the present invention can be implemented in numerous ways, such as a process, an apparatus, a system, a device, instructions on a computer readable medium. Several inventive embodiments of the present invention are described below.

In certain embodiments, the above mentioned interface circuitry may include a buffer and generate a status information which may be indicative of a current processing capacity of the buffer. The interface circuitry may also provide this status information to the application layer module.

Further features of the invention, its nature and various advantages, will be more apparent from the accompanying drawings and the following detailed description of the preferred embodiments.

DETAILED DESCRIPTION

Figure 1:
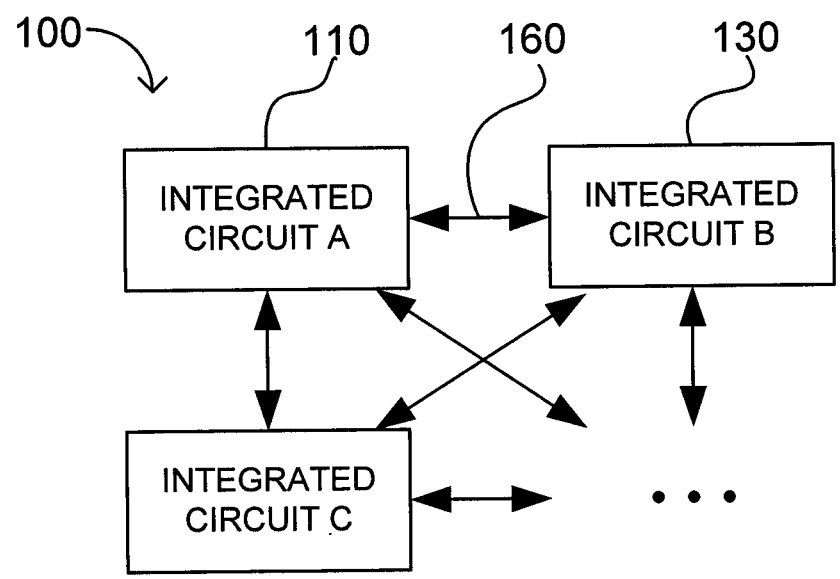
FIG. 1 is a diagram of an illustrative system of interconnected integrated circuits in accordance with an embodiment of the present invention.

Embodiments of the present invention relate to methods for controlling the communication between integrated circuits (ICs) over high-speed input-output interconnects. As noted above, integrated circuits may communicate with one another via the Peripheral Component Interconnect Express® (commonly referred to as PCI Express or PCIe) technology.

In many PCI Express endpoint (PCIe EP) designs, most of the data traffic is created by non-posted read requests (i.e., requests that require the requester to wait for a confirmation of completion of the request) and posted write requests (i.e., requests that are just sent and that do not require confirmations) with large data lengths issued by the PCIe endpoint itself. As a result, most of the bandwidth towards the PCIe root port (PCIe RP) is being consumed by write requests with large data payloads issued by the PCIe endpoint. Most of the bandwidth from the PCIe RP towards the PCIe EP is consumed by read completions with large data payloads that were issued by the PCIe RP in response to the read requests issued by the PCIe EP. A PCIe EP designed to operate according to the PCIe specification will be able to support the full bandwidth of the issued write requests and the received read completions.

However, a PCI Express endpoint may also receive write requests and to a lesser extent read requests, both of which may be issued by the host processor software associated with the PCIe RP. The write and read requests received by the PCIe EP are used to control the operation and monitor the status of the PCIe endpoint. PCIe endpoints may be slow at handling these write and read requests since they are overall relatively infrequent.

A situation may arise where the PCIe EP is the target of a large burst of write requests from the host software, sometimes also referred to as "posted write storms." The PCIe endpoint may spend more time processing the write requests received in these bursts than the time these posted write requests are delayed by the serial link connection.

PCIe ordering rules typically require received posted write requests and received completions to be kept in order. Thus, a general purpose PCIe interface core must keep these write requests and read completions together in a first-in first-out (FIFO) buffer. The slow processing of a burst of write requests may delay the processing of the read completions which in turn may cause a loss in performance of the PCIe endpoint application.

PCIe endpoints are able to use flow control semantics to control the number of received posted write requests and non-posted read requests. However, PCIe EP are not allowed by the PCIe specification to control the flow of incoming read completions.

The above system design issues may result in a situation where a fixed size receive buffer for handling received write requests and read completions in FIFO order could be overrun with read completion data when the emptying of the receive buffer is slowed by the handling of a burst of write requests.

In order to avoid overrunning the receive buffer with read completion data, the PCIe end point read request logic should be designed to never issue more read requests than the receive buffer has space available for handling the resulting read completions. As a result, the receive buffer must be large enough to handle enough read completions to cover the round trip latency of the read requests to the read completions. A receive buffer in a general purpose PCIe IP core can be sized to handle typical round trip latencies. However, sizing the receive buffer in a general purpose PCIe IP core based on the worst case latencies that may occur only in a small number of PCIe IP core user applications may not be cost effective.

Other situations may arise where the amount of read requests issued by the PCIe endpoint may be difficult to control. For example a PCIe endpoint with many internal read requesters, such as in a multi-function PCIe endpoint, may have difficulties in apportioning enough read requests to ensure the efficient and independent operation of each of the individual requesters, while maintaining a low risk for overrunning the receive buffer with read requests.

Therefore, it may be desirable to provide a PCIe EP IP core, which can be configured to always process read completions at full line rate, thereby freeing the PCIe endpoint read requester or requesters from throttling the read requests based on the PCIe EP IP cores's available receive buffer space.

It would be desirable to develop a more efficient solution for regulating the data transmission over the high-speed serial link. Such a solution may include additional circuitry in the application layer and a configuration of the interface circuitry. The additional circuitry would allow the application layer to control when posted request credits are released on the link.

It will be obvious to one skilled in the art, that the present exemplary embodiments may be practiced without some or all of these specific details. In other instances, well-known operations have not been described in detail in order not to unnecessarily obscure the present embodiments.

An illustrative system 100 of interconnected integrated circuits is shown in FIG. 1. The system of interconnected integrated circuits has one or more integrated circuits such as integrated circuit A (shown a 110 in FIG. 1), integrated circuit B (shown as 130 in FIG. 1), and interconnection resources 160. The integrated circuits may be any suitable type of integrated circuit that communicates with other integrated circuits. Such integrated circuits include analog circuits, digital circuits, and mixed-signal circuits. Exemplary integrated circuits (ICs) include programmable array logic (PAL), programmable logic arrays (PLAs), field programmable logic arrays (FPLAs), electrically programmable integrated circuits (EPLDs), electrically erasable programmable integrated circuits (EEPLDs), logic cell arrays (LCAs), field programmable gate arrays (FPGAs), application specific standard products (ASSPs), application specific integrated circuits (ASICs), just to name a few. Interconnection resources 160 such as conductive lines and busses, high-speed serial links, optical interconnect infrastructure, or wired and wireless networks with optional intermediate switches may be used to send data from one integrated circuit to another integrated circuit or to broadcast data from one integrated circuit to multiple other integrated circuits. Integrated circuits A and B may be assembled in different ways. For example, integrated circuits A and B may be in different packages, in the same package, stacked with wire-bond connections, or assembled using through-silicon-vias (TSV), to name a few.

Figure 2:
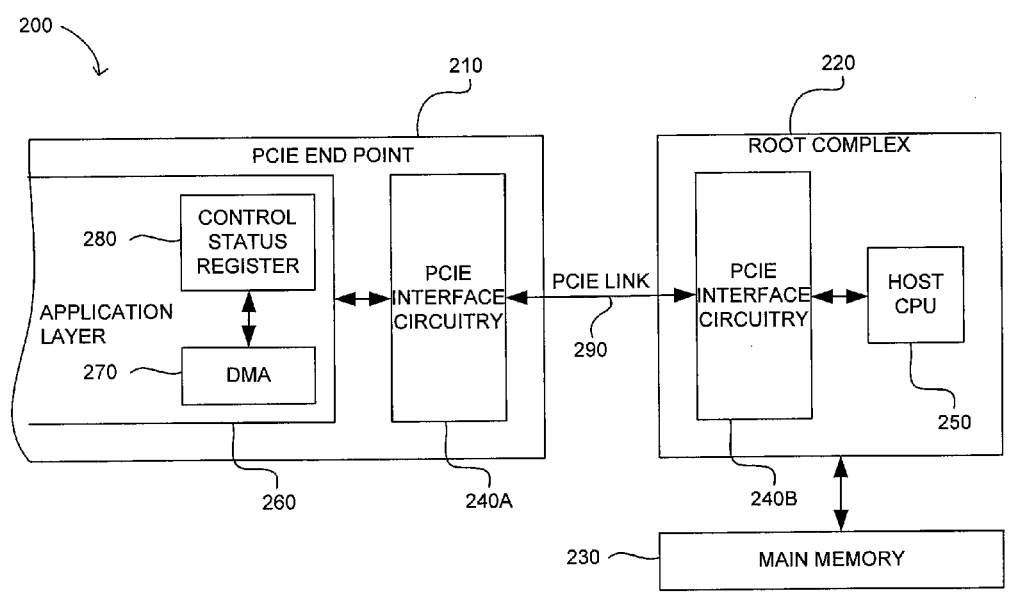
FIG. 2 is a diagram of illustrative interconnected integrated circuits that may communicate over a Peripheral Component Interconnect Express® (PCIe) link in accordance with an embodiment of the present invention.

FIG. 2 is a diagram of an example of interconnected integrated circuits that communicate over a Peripheral Component Interconnect Express® (PCIe) link 290. In the example of FIG. 2, integrated circuit 220 may implement a root complex and integrated circuit 210 may implement a PCIe endpoint.

Integrated circuits that communicate over a PCIe link may be arranged in form of a tree. This tree may have several leaves or endpoints which may be supported via multiple root ports on the root complex. Alternatively, a root port may be coupled to a switch which may be coupled to multiple endpoints (not shown). A switch may include one upstream switch port that couples the switch to a root port or another switch and one or more downstream switch ports that connect to endpoints, PCI bridges or other switches.

The root complex may include a host central processing unit (CPU) 250 and PCIe interface circuitry 240B. PCIe interface circuitry 240B may be configured as a PCIe root port. Root complex 220 may be coupled to main memory 230 through a memory interface. Main memory 230 may be implemented using any suitable memory technology (e.g., synchronous dynamic random-access memory (SDRAM) such as double data rate type three SDRAM (DDR3 SDRAM)). Integrated circuit 220 may be connected with integrated circuit 210 via PCIe link 290. The PCIe endpoint may include PCIe interface circuitry 240A and application layer 260. Application layer 260 may include direct memory access (DMA) module 270, control status register 280, and other modules not shown in FIG. 2 that a user may implement as part of an application layer.

Consider a scenario in which DMA module 270 generates a read request for retrieving data from main memory 230 and sends this read request to PCIe interface circuitry 240A. PCIe interface circuitry 240A may send the read request over PCIe link 290 to integrated circuit 220. integrated circuit 220 may retrieve the requested data from main memory 230 and send the retrieved data as a completion over PCIe link 290 to PCIe interface circuitry 240A. The completion would then be forwarded to DMA module 270.

PCIe interface circuitry 240A may receive additional signals from integrated circuit 220 over PCIe link 290 such as write requests, read requests, messages, etc. All signals received by PCIe interface circuitry 240A in integrated circuit 210 may be processed and sent to application layer 260 for further processing. For example, PCIe interface circuitry 240A may receive posted write requests and non-posted requests executed by integrated circuit 220. Posted write requests and non-posted read requests may be monitored and processed by control status register 280.

Figure 4:
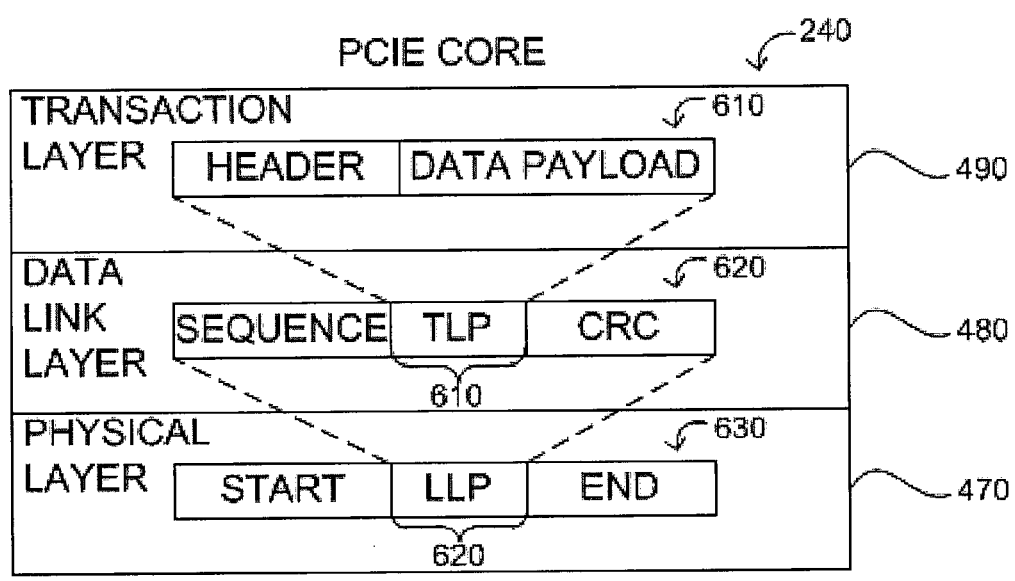
FIG. 4 is a diagram of an illustrative PCIe core showing the elements of a packet in the physical layer, the data link layer, and the transaction layer in accordance with an embodiment of the invention.

PCI Express is a layered protocol that includes physical layer, a data link layer, and a transaction layer FIG. 4 is an illustrative diagram showing different data types that can be handled at each respective layer within an exemplary PCIe interface circuitry 240. The transaction layer may receive requests from an associated application layer to generate transaction layer packets (TLPs) such as memory packets. I/O packets, configuration packets message packets, and other types of packets. A TLP 610 may, for example, include user information sometimes referred to as "data payload" and header information (e.g., source and destination address information). In a transmit scenario, the transaction layer may forward the TLP to the data link layer. In a receive scenario, the transaction layer may receive a TLP from the data link layer and may forward the relevant requests to the associated application layer.

The data link layer (or link layer) may be used to ensure reliable packet delivery across the PCIe interface. In a transmit scenario, the link layer may append sequence bits and cyclic redundancy check (CRC) bits to each TLP 610 to form a link layer packet (LLP) 620. In a receive scenario, the link layer may analyze the sequence number and the CRC bits to determine whether the receive LLP 620 is a valid packet that is free of errors. If the received LLP 620 is determined to be satisfactory, a positive acknowledgement message (ACK) may be transmitted back to the sender to signal a successful delivery. If the received LLP 620 is determined to be erroneous and/or corrupted, a negative acknowledgement message (NAK) may be transmitted back to the sender to signal a packet retry.

The physical layer may be used to negotiate lane widths in each link and rate of transmission between two PCIe-ready devices without any software/firmware-level intervention. The physical layer may append additional information such as "start" and "end" indicators to each LLP 620 to form a physical layer packet (PLP) 630. The physical layer may also serve to perform other hardware-level operations such as 8b/10b encoding, data serialization-deserilalization, lane-to-lane deskew, inter-symbol interference reduction, etc.

The properties of a PCIe protocol stack 240 described herein in connection with FIG. 4 are merely illustrative. In general, the transaction layer, data link layer, and physical layer may perform other software-level or hardware-level data manipulation operations for supporting high-speed serial point-to-point data transmission across a PCIe interface.

Figure 5:
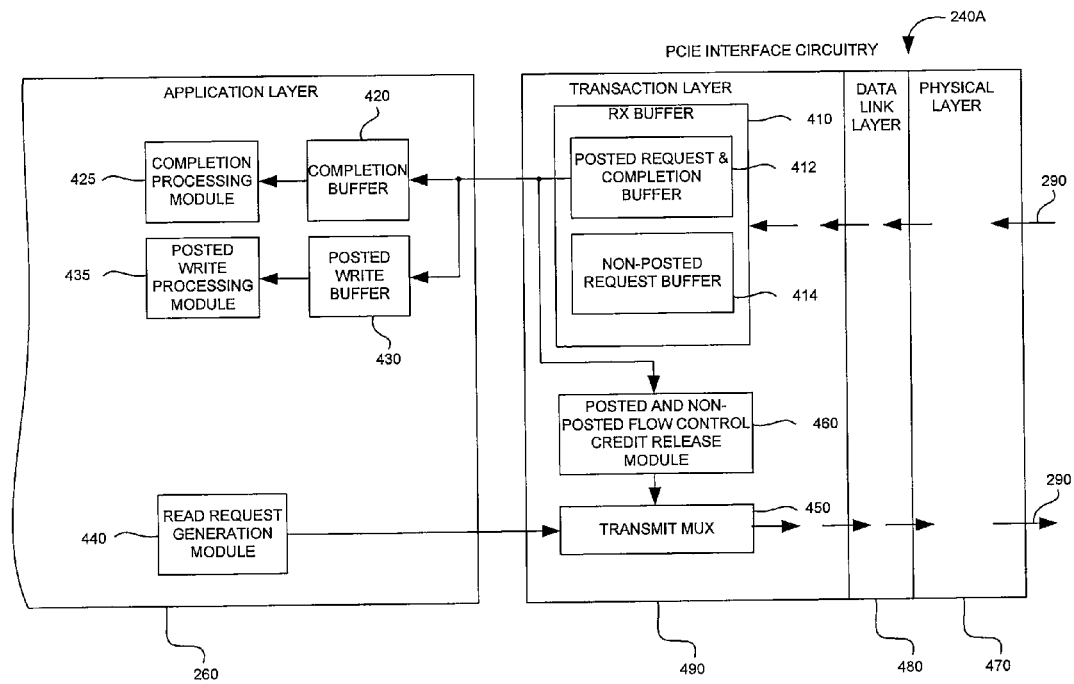
FIG. 5 is a diagram of an illustrative PCIe endpoint showing the generation of credits in the transaction layer and the application layer in accordance with an embodiment of the invention.

FIG. 5 shows PCIe interface circuitry 240A from FIG. 2 in more detail. PCIe interface circuitry 240A may include a physical layer (sometimes abbreviated as PHY) 470, a data link layer (sometimes abbreviated as DL) 480, and a transaction layer (sometimes abbreviated as TL) 490. Transaction layer 490 may include a receive buffer (sometimes abbreviated as Rx buffer) 410, posted and non-posted flow control credit release module 460, and transmit multiplexer 450. PCIe interface circuitry 240A may be connected to an application layer 260. Application layer 260 may include read request generation module 440 for generating requests for information that are sent to PCIe interface circuitry 240A and from there over PCIe link 290. Application layer 260 may also include circuitry for receiving data over PCIe link 290 and PCIe interface circuitry 240A. For example, application layer 260 may include a completion buffer 420 and a completion processing module 425 for receiving and processing completions. Application layer 260 may also include a posted write buffer 430 and a posted write processing module 435 for receiving and processing posted write transactions.

Every layer of PCIe interface circuitry 240A adds information to a data packet during transmission (e.g., as shown in FIG. 4) as the data packet is moved from layer to layer and transmitted over PCIe link 290 to another integrated circuit. Similarly, during data packet reception over PCIe link 290, every layer strips information from the received data packet as the data packet is moved from layer to layer. PCIe interface circuitry 240A may deliver the data payload to application layer 260. Similarly, the data received from the application layer 260 in the PCIe interface circuitry 240A may represent the data payload in the transaction layer packet 610.

PCI Express distinguishes between posted transactions and non-posted transactions. Non-posted transactions are transactions where the requester expects to receive a completion TLP from the device completing the request. For read requests, the completion TLP includes the read data. An example for a non-posted transaction is memory read request. Posted transactions are transactions where the requester does not receive a completion TLP. An example for a posted transaction is a memory write request.

According to the PCIe specification, non-posted transactions such as memory read requests may be stalled while posted transactions and completion TLP must be allowed to pass the transaction layer 490. Therefore, the receive buffer may include a separate non-posted request buffer 414 and a posted-request and completion buffer 412. Posted, transactions and completion TLP may use the same buffer 412 because they have to be received and processed in order. Alternatively, Rx buffer 410 may be a single buffer with different amount of space reserved for the different transaction types. For example, Rx buffer 410 may reserve a given amount of buffer space for completion TLP, another amount of buffer space for posted trans actions, and a third amount of buffer space for non-posted transactions.

Since posted transactions and completions TLPs must be allowed to pass through the transaction layer 490, application layer 260 may include a completion buffer 420 and a posted write buffer 430. Whenever completion buffer 420 and posted write buffer 430 receive data from posted request and completion buffer 412, posted and non-posted flow control credit release module 460 may make credit available to transmit multiplexer 450 whereby the amount of credit corresponds to the amount of data transferred between the buffers.

The PCIe specification prevents PCIe endpoints from directly flow controlling completions. Instead, PCIe endpoints have to advertise infinite credits for completions. Thus, the application layer needs to ensure that less read requests are issued than can be handled by the completion buffer space.

Situations frequently arise where fast-paced write operations, sometimes also referred to as "posted write storms" cause the posted write buffer 430 to fill up with data because data arrives faster than the data can be processed by the posted write processing module 435. When the posted write buffer 430 is full, no TLP may be read from the posted request and completion buffer 412 which may block the passage of completion TLP and cause the posted request and completion buffer 412 to overflow. If the posted request and completion buffer overflows, there is an unrecoverable loss of posted requests or completions.

Increasing the size of posted request and completion buffer 412 may help prevent buffer overflow in some cases but may not be sufficient to avoid buffer overflow in all cases. Increasing the buffer size also increases the size and thereby the cost of the PCIe interface circuitry 240A. Using separate receive buffers for posted transactions and completion TLP has different problems. For example, the PCI Express protocol requires that the posted transactions and completion TLP are processed in a given order. Therefore, using separate receive buffers for posted transactions and completion TLP may require a significant amount of additional control logic, and in many cases the transfer of completions to the application layer may still be blocked behind other posted write transactions due to the PCIe specified ordering rules.

Figure 6:
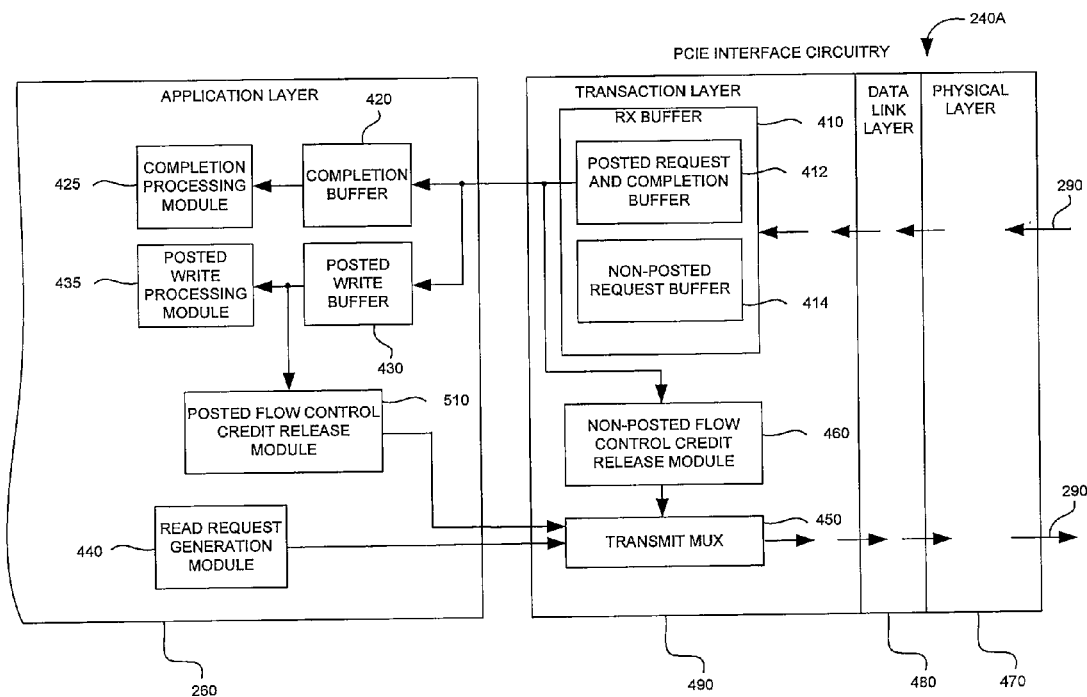
FIG. 6 is a diagram of an illustrative PCIe protocol stack accordance with an embodiment of the present invention.

It may be desirable to address the problem of posted write storms by a more effective and efficient solution. FIG. 6 shows such a solution. In addition to the elements shown in FIG. 5, application layer 260 may include a posted flow control credit release module 510 that may generate and send credits to transmit multiplexer 450 in transaction layer 490. For example, posted flow control credit release module 510 may generate a credit whenever posted write processing module 435 receives data from posted write buffer 430. Sizing posted write buffer 430 as least as big as posted request and completion buffer 412 may ensure that posted request and completion buffer 412 is never overrun by posted transactions.

Transaction layer 490 may be configured to accept the credits sent by the application layer. Transmit multiplexer 450 may further be configured to accept credit from posted flow control credit release module 510 and to refuse credits from posted and non-posted flow control credit release module 460, thereby effectively moving the credit management from the transaction layer 490 to the application layer 260.

In this configuration, emptying posted request and completion buffer 412 may not be blocked by posted requests. Thus, read request generation module 440 no longer needs to manage the space available for completions in the posted request and completion buffer 412 of transaction layer 490. Instead, read request generation module 440 may manage the space in completion buffer 420 of application layer 260. Completion buffer 420 may be sized larger than the space in Rx buffer 410 based on the requirements of a given application, thereby improving performance and only burdening the given application with a larger completion buffer instead of burdening every application with a larger Rx buffer. A given application may eliminate the need for completion buffer 420 altogether if completion processing module 425 is able to handle completions at the maximum rate at which the completions may be delivered by PCIe link 290. In such a scenario, read request generation module 440 may not need to control the issuance of read requests at all. The transfer of the credit management from transaction layer 490 to application layer 260 also transfers the responsibility of ensuring that the ordering rules regarding the processing of completions and posted requests are met from transaction layer 490 to application layer 260. Application layer 260 has application specific knowledge about the usage of completions and posted requests. Thus, application layer 260 may ensure throughput at line rate for completion TLP through the transaction layer, and guaranteeing that the application critical throughput may be maintained.

Consider the scenario in which the application layer is unable to empty posted Rx buffer 410 in transaction layer 490 when the PCIe interface circuitry is operating at line rate. In this scenario, it may be desirable to provide an early indication about the status of Rx buffer 410 to application layer 260. As an example, transaction layer 490 may produce additional status information about Rx buffer 410 and send this status information to application layer 260. For example, transaction layer 490 may indicate how full or how empty the posted request and completion buffer 412 is. Alternatively, transaction layer 490 may indicate how full the space in Rx buffer 410 is that may be reserved for completion TLP. Similarly, transaction layer 490 may indicate how much space reserved for completion TLP is left in Rx buffer 410. In the scenario where a posted write storm would cause the posted request and completion buffer 412 to fill up, application layer 260 may receive corresponding status information from transaction layer 490. In response to receiving status information indicating that the posted request and completion buffer is filling up, application layer 260 may decide to slow down the generation of read requests, in the read request generation module 440 to prevent a potential overflow of the Rx buffer at a later time even though enough credits may be available for enabling the transmission of read requests in transmit multiplexer 450.

Figure 7:
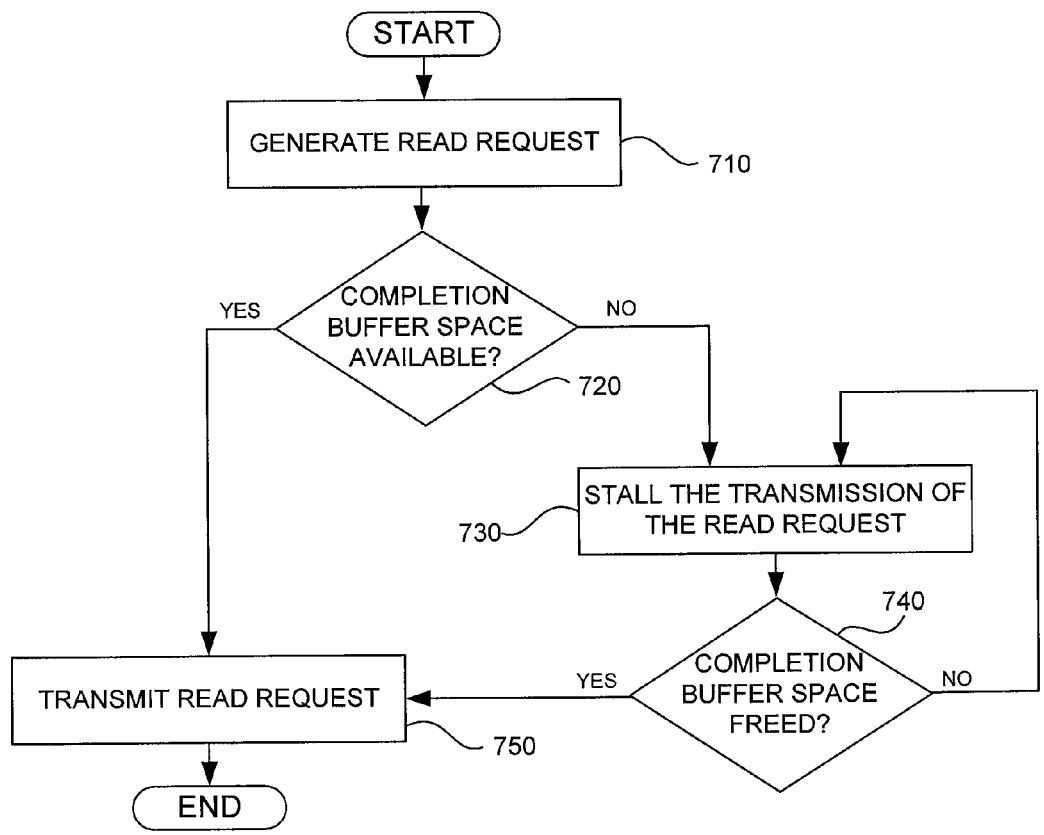
FIG. 7 is a flow chart of illustrative steps for controlling the transmission of read requests based on the availability of completion buffer space in accordance with an embodiment of the present invention.

FIG. 7 is a flow chart of illustrative steps for controlling the transmission of read requests in transmit multiplexer 450 based on the availability of completion buffer space. During step 710, read request generation module 440 may generate a read request and send the read request from application, layer 260 to transaction layer 490. The read request may be received by transmit multiplexer 450. During step 720, transmit multiplexer 450 may verify whether sufficient completion buffer space is available. In response to determining that sufficient completion buffer space is available, transmit multiplexer 450 may transmit the read request as shown in step 750. In response to determining that no completion buffer space is available, transmit multiplexer 450 may stall the transmission of the read request as shown in step 730. As long as no completion buffer space is freed, transmit multiplexer 450 may stall the transmission of the read request as illustrated by the loop over steps 740 and 730 in FIG. 7. In response to emptying at least some portion of the completion buffer, transmit multiplexer 450 may transmit the read request as shown in step 750.

Figure 8:
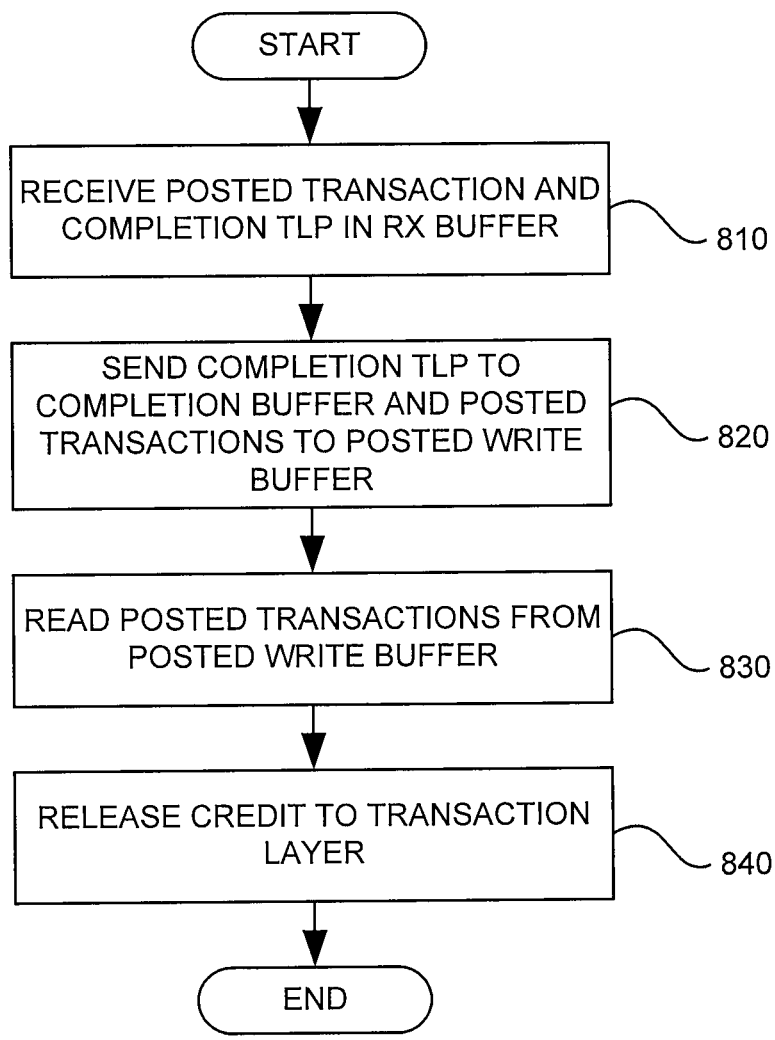
FIG. 8 is a flow chart of illustrative steps for transmitting read requests depending on the processing of received posted write requests in accordance with an embodiment of the present invention.

FIG. 8 is a flow chart of illustrative steps for transmitting posted flow control credits based on the processing of posted write requests. During step 810, posted transactions and completion TLP are received in Rx buffer 410 of transaction layer 490 of FIG. 6. During step 820, transaction layer 490 may send completion TLP from Rx buffer 410 to completion buffer 420 and posted transactions from Rx buffer 410 to posted write buffer 430 in application layer 260. During step 830, posted write processing module 435 may read posted transactions from posted write buffer 430 for further processing. Upon reading a posted transaction from posted write buffer 430, posted flow control credit release module 510 may generate a credit and release this credit to the transaction layer, as shown in step 840.

Figure 3:
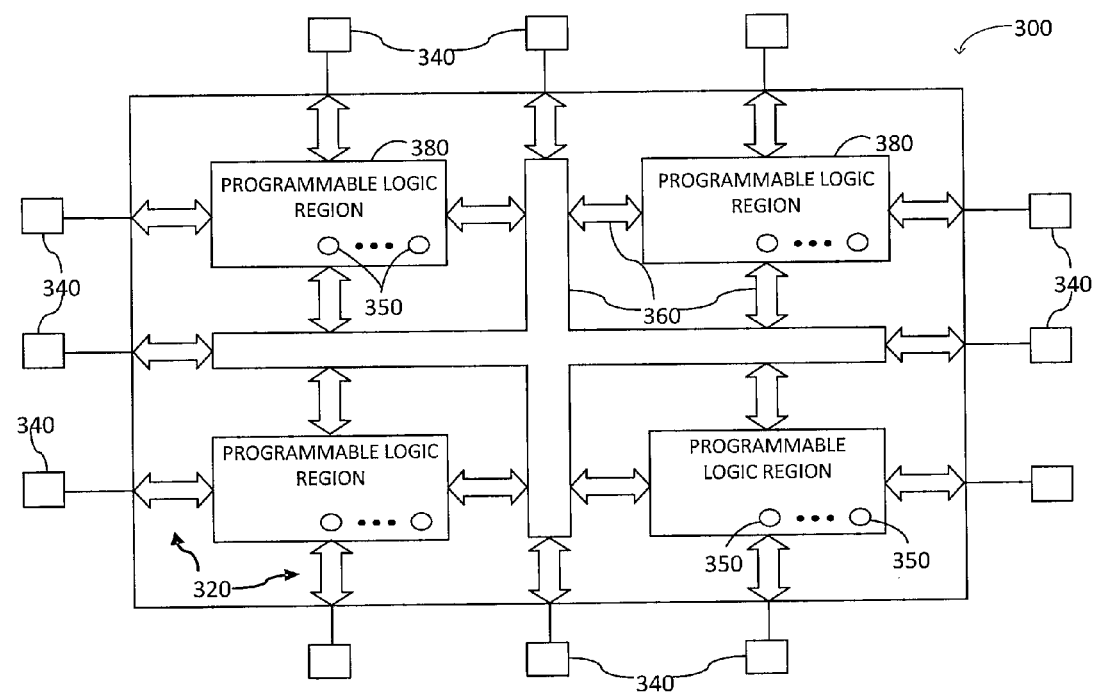
FIG. 3 is a diagram of an illustrative programmable integrated circuit in accordance with an embodiment of the present invention.

An example for an integrated circuit that may communicate via a PCIe link is a programmable integrated circuit 300 shown in FIG. 3. Programmable integrated circuit 300 has input/output circuitry 320 for driving signals off of programmable integrated circuit 300 and for receiving signals from other integrated circuits via input/output pins 340. Interconnection resources 360 such as global and local vertical and horizontal conductive lines and buses may be used to route signals on programmable integrated circuit 300.

Input/output circuitry 320 includes parallel input/output circuitry, serial data transceiver circuitry, differential receiver and transmitter circuitry, or other circuitry used to connect one integrated circuit to another integrated circuit.

Interconnection resources 360 include conductive lines and programmable connections between respective conductive lines and are therefore sometimes referred to as programmable interconnects 360.

Programmable logic region 380 may include programmable components such as digital signal processing circuitry, storage circuitry, arithmetic circuitry, programmable phase-locked loop circuitry, programmable delay-locked loop circuitry, or other combinational and sequential logic circuitry. Programmable logic region 380 may further include hardened intellectual property blocks that may be configurable as well as mask programmable circuitry, and other types of hardened circuitry. This hardened circuitry may implement any specific application. For example, the hardened circuitry may implement support for specific memory interfaces such as DDRx or support for high-speed serial interface protocols such as PCIe, Ethernet, Interlaken, etc. The programmable logic region 380 may be configured to perform a custom logic function. The programmable interconnects 360 may be considered to be a type of programmable logic region 380.

Programmable integrated circuit 300 contains programmable memory elements 350. Memory elements 350 can be loaded with configuration data (also called programming data) using pins 340 and input/output circuitry 320. Once loaded, the memory elements each provide a corresponding static control signal that controls the operation of an associated logic component in programmable logic region 380. In a typical scenario, the outputs of the loaded memory elements 350 are applied to the gates of metal-oxide-semiconductor transistors in programmable logic region 380 to turn certain transistors on or off and thereby configure the logic in programmable logic region 380 and routing paths. Programmable logic circuit elements that may be controlled in this way include portions of multiplexers (e.g., multiplexers used for forming routing paths in programmable interconnects 360), look-up tables, logic arrays, AND, OR, NAND, and NOR logic gates, pass gates, etc.

Memory elements 350 may use any suitable volatile and/or non-volatile memory structures such as random-access-memory (RAM) cells, fuses, antifuses, programmable read-only-memory memory cells, mask-programmed and laser-programmed structures, combinations of these structures, etc. Because memory elements 350 are loaded with configuration data during programming, memory elements 350 are sometimes referred to as configuration memory, configuration RAM, or programmable memory elements.

The circuitry of programmable integrated circuit 300 may be organized using any suitable architecture. As an example, the logic of programmable integrated circuit 300 may be organized in a series of rows and columns of larger programmable logic regions each of which contains multiple smaller logic regions. The smaller regions may be, for example, regions of logic that are sometimes referred to as logic elements (LEs), each containing a look-up table, one or more registers, and programmable multiplexer circuitry. The smaller regions may also be, for example, regions of logic that are sometimes referred to as adaptive logic modules (ALMs). Each adaptive logic module may include a pair of adders, a pair of associated registers and a look-up table or other block of shared combinational logic (i.e., resources from a pair of LEs—sometimes referred to as adaptive logic elements or ALEs in this context). The larger regions may be, for example, logic array blocks (LABs) containing multiple logic elements or multiple ALMs.

During programming, configuration data is loaded into programmable integrated circuit 300 that configures the programmable logic regions 380 so that their logic resources perform desired logic functions on their inputs and produce desired output signals.

The resources of programmable integrated circuit 300 such as programmable logic region 380 may be interconnected by programmable interconnects 360. Interconnects 360 may include vertical and horizontal conductors. These conductors may include global conductive lines that span substantially all of programmable integrated circuit 300, fractional lines such as half-lines or quarter lines that span part of programmable integrated circuit 300, staggered lines of a particular length (e.g., sufficient to interconnect several logic array blocks or other such logic areas), smaller local lines, or any other suitable interconnection resource arrangement. Some conductors may allow the distribution of signals to all programmable logic regions 380 of the programmable integrated circuit 300 with minimal skew if any. Those conductors are preferably used to distribute clock signals or global reset signals.

If desired, the logic of programmable integrated circuit 300 may be arranged in more levels or layers in which multiple large regions are interconnected to form still larger portions of logic. Still other programmable integrated circuits may use logic that is not arranged in rows or columns.

In addition to the relatively large blocks of programmable logic that are shown in FIG. 3, the programmable integrated circuit 300 generally also includes some programmable logic associated with the programmable interconnects, memory, and input-output circuitry on programmable integrated circuit 300. For example, input/output circuitry 320 may be configured to support different high-speed serial interface (HSSI) protocols, such as XAUI, SerialRapidIO, Interlaken, PCIe, HyperTransport, Ethernet, etc., to name a few.

The programmable integrated circuit described herein may be part of a data processing system that includes one or more of the following components; a processor; memory; I/O circuitry; and peripheral devices. The data processing system can be used in a wide variety of applications, such as computer networking, data networking, instrumentation, video processing, digital signal processing, or any suitable other application where the advantage of using programmable or re-programmable logic is desirable. The programmable integrated circuit can be used to perform a variety of different logic functions. For example, the programmable integrated circuit can be configured as a processor or controller that works in cooperation with a system processor. The programmable integrated, circuit may also be used as an arbiter for arbitrating access to a shared resource in the data processing system. In yet another example, the programmable integrated circuit can be configured as an interface between a processor and one of the other components in the system. In one embodiment, the programmable integrated circuit may be one of the family of devices owned by the assignee.

Although the method operations were described in a specific order, it should be understood that other operations may be performed in between described operations, described operations may be adjusted so that they occur at slightly different times or described operations may be distributed in a system which allows the occurrence of the processing operations at various intervals associated with the processing, as long as the processing of the overlay operations are performed in a desired way.

The foregoing is merely illustrative of the principles of this invention and various modifications can be made by those skilled in the art without departing from the scope and spirit of the invention.

What is claimed is:

1. A method for operating interface circuitry in an endpoint device that is coupled to a serial communications link, wherein the interface circuitry is operable to interface with an application layer module in the endpoint device, the method comprising:
   with the interface circuitry, receiving a credit from the application layer module, wherein the interface circuitry implements a Peripheral Component Interconnect Express (PCIe) endpoint having a PCIe protocol stack; and
   in response to receiving the credit from the application layer module, transmitting the credit over the serial communications link.

2. The method of claim 1 further comprising:
   receiving a read request from the application layer module;
   determining whether a buffer in the application layer module has available space; and
   in response to determining that the buffer in the application layer has available space, transmitting the read request over the serial communications link.

3. The method of claim 1, wherein the application layer module includes a buffer that receives data signals from the interface circuitry, the method further comprising:
   generating an initial number of credits based on the size of the buffer.

4. The method of claim 3, wherein receiving the credit from the application layer module comprises receiving a credit from the application layer module whenever a data signal is read from the buffer.

5. The method of claim 1, wherein the interface circuitry includes a buffer, the method further comprising:
   generating a status information that indicates a current processing capacity of the buffer.

6. The method of claim 5 further comprising:
   providing the status information to the application layer module.

7. An endpoint integrated circuit, comprising:
   interface circuitry operable to transmit data over a serial communications link;
   an application layer module operable to produce a credit signal that indicates a current processing capacity for the application layer module, wherein the interface circuitry receives the credit signal from the application layer module and transmits the credit signal over the serial communications link.

8. The endpoint integrated circuit of claim 7, wherein the interface circuitry implements a Peripheral Component Interconnect Express (PCIe) endpoint having a PCIe protocol stack.

9. The endpoint integrated circuit of claim 7, wherein the application layer module comprises programmable circuitry having programmable logic regions configured to form the application layer module.

10. The endpoint integrated circuit of claim 7, wherein the interface circuitry receives data over the serial communications link and sends the data to the application layer module, wherein the application layer module further comprises:
    a buffer that receives the data from the interface circuitry.

11. The endpoint integrated circuit of claim 10, wherein the interface circuitry receives additional data over the serial communications link and sends the additional data to the application layer module, wherein the application layer module further comprises:
    an additional buffer that receives the additional data from the interface circuitry.

12. The endpoint integrated circuit of claim 10, wherein the buffer has slots, and wherein the application layer module produces a credit signal for every available slot in the buffer.

13. The endpoint integrated circuit of claim 10, wherein the buffer has slots, and wherein the application layer module produces a credit signal when a slot in the buffer becomes available.

14. A method for operating an application layer module that is coupled to an interface circuit and that includes a buffer with a given size, comprising:
    with the application layer module, generating credits based on the given size of the buffer; and
    with the application layer module, sending the credits to the interface circuit for transmission over a serial communications link, wherein the application layer module and the interface circuit are both in an integrated circuit.

15. The method of claim 14, wherein the interface circuit comprises a transaction layer of a Peripheral Component Interconnect Express (PCIe) protocol stack.

16. The method of claim 14 further comprising:
    reading a signal from the buffer;
    in response to reading the signal from the buffer, producing a credit; and
    sending the credit to the interface circuit for transmission over the serial communications link.

17. The method of claim 14 further comprising:
    receiving a signal from the interface circuit; and
    storing the signal in the buffer.

18. The method of claim 17 further comprising:
    receiving an additional signal from the interface circuit; and
    storing the additional signal in an additional buffer.

19. The method of claim 18 wherein the signal and the additional signal are received from a receive buffer in the interface circuit.

20. The method of claim 18 further comprising:
    generating a second additional signal; and
    sending the generated second additional signal to the interface circuit for transmission over the serial communications link.

21. The method of claim 20 further comprising:
    determining whether the additional buffer has available space; and
    in response to determining that the additional buffer has no available space, preventing the generated second additional signal from being sent to the interface circuit.

* * * * *